April 21, 1953     A. R. MOFFETT     2,635,623
TIRE INFLATOR VALVE DEVICE WITH PRESSURE GAUGE
Filed April 19, 1948
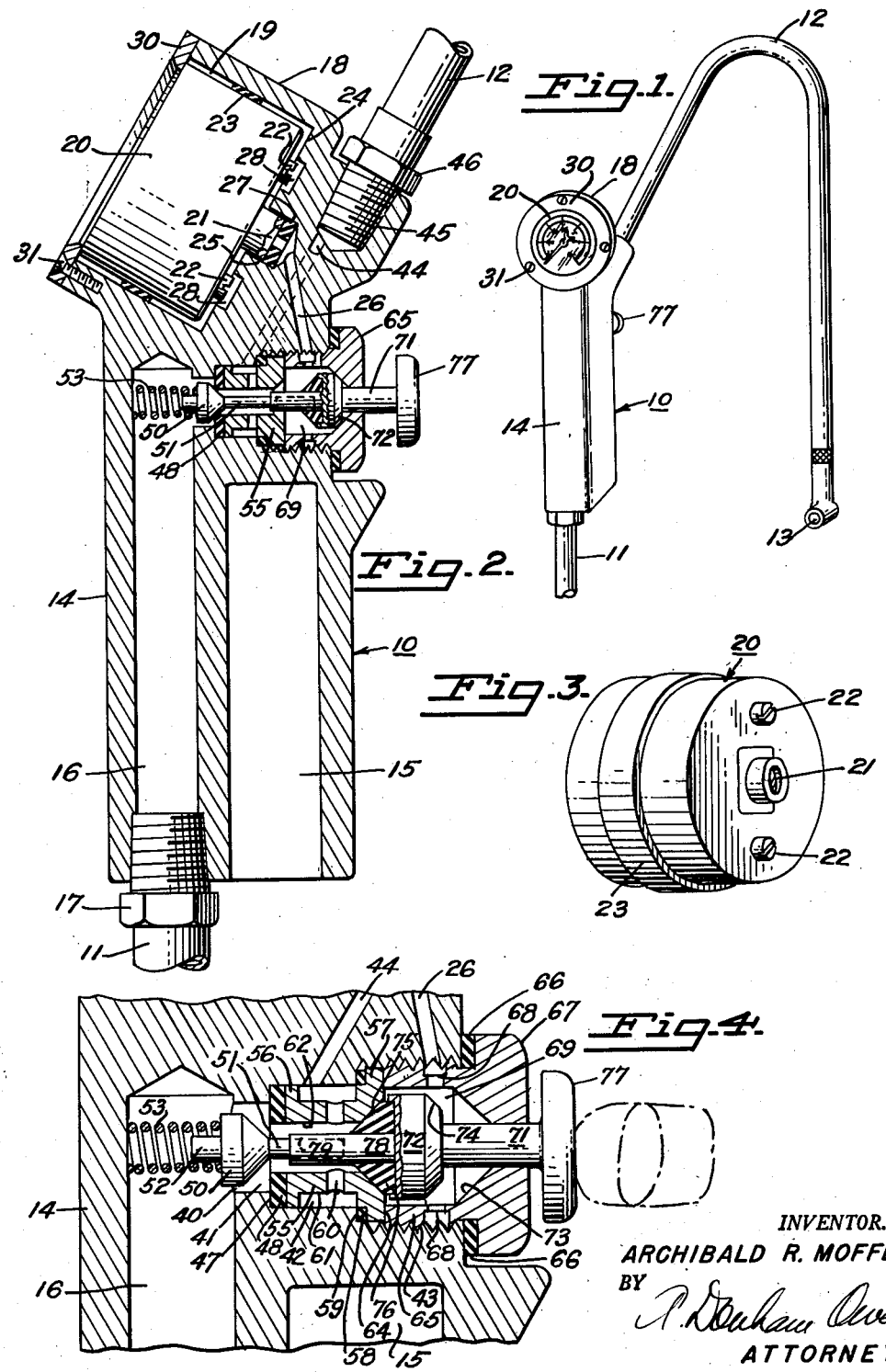
INVENTOR.
ARCHIBALD R. MOFFETT
BY
ATTORNEY Patented Apr. 21, 1953

2,635,623

UNITED STATES PATENT OFFICE 2,635,623

TIRE INFLATOR VALVE DEVICE WITH PRESSURE GAUGE

Archibald R. Moffett, Orinda, Calif.

Application April 19, 1948, Serial No. 21,972

3 Claims. (Cl. 137—229)

This invention relates to an improved inflator and has particular applicability as an automobile-tire inflator or valve-and-gauge assembly installed near the outlet chuck of a compressed-air hose. More particularly it relates to an inflator, including in combination a valve and a removable gauge constructed from a small number of rugged parts and adapted to secure a tight closure at the valve, to protect the gauge from the full pressure of the compressed-air in the line, to transmit to the gauge the pressure in the tire after each inflation, and to permit quick and simple assembly and disassembly of the parts.

Filling station inflators in current use are characterized by a complicated arrangement of working parts including series of springs, sliding gauge parts, leather washers and bearings. These parts soon wear or get dirty so that the friction between the sliding parts increases and affects the accuracy and the reliability of the gauge. When repair or replacement becomes necessary the whole inflator must be replaced and the used one taken to a service station to be rebuilt. The valve mechanism is generally inseparable from the gauge mechanism, and when it wears out or is broken, the entire inflator must be replaced.

In addition to the above disadvantages, the gauges of present-day inflators are difficult to read and often are in an awkward position.

One object of the invention is to provide an inflator, which solves these problems.

A further object of the invention is to provide an inflator comprising a small number of simple parts.

Another object of the invention is to provide an inflator which is capable of ready assembly, disassembly, and reassembly.

Another object of the invention is to provide an inflator having a valve mechanism which can be readily disassembled and reassembled without disturbing the gauge element.

Another object of the invention is to provide an inflator which fits conveniently in either hand in such a manner that the gauge dial is in a good reading position.

Another object of the invention is to provide an inflator in which the gauge and valve are so arranged as to protect the gauge from the full line pressure.

A further object of the invention is to provide an inflator in which the tire pressure is automatically measured by the gauge whenever the line pressure is cut off.

Another object of the invention is to provide an inflator having a valve mechanism which utilizes the line pressure which it controls to achieve a quick and complete seating of the parts.

Another object of the invention is to provide an inflator having a valve composed of a small number of simple parts having a long life.

Other objects and advantages of the invention will appear from the following description. A detailed embodiment is described in accordance with U. S. Revised Statutes, Section 4888, but the invention is not to be limited to this specific embodiment.

In the drawings:

Fig. 1 is a view in perspective of an inflator embodying the principles of this invention;

Fig. 2 is a view in section of the inflator, the valve being shown in its closed position;

Fig. 3 is a view in perspective looking at the rear of the gauge; and

Fig. 4 is an enlarged view in section of the valve mechanism, showing it in its open position.

In general, the invention comprises a body member 14 having an enlarged head 18 in which there is a large recess 19 lying at an angle to the axis of the body and adapted to receive a removable gauge element 20. A retaining ring 30 fits around the open end of the recess 19 and presses the gauge 20 into the recess so that its inlet 21 bears firmly against an air conduit 26. In the main portion of the body member 14 is a valve-receiving recess 40, which communicates with a pressure-line or inlet 16, the gauge conduit 26, and an outlet 44 between them. A first valve seat 48 is provided between the inlet 16 and outlet 44, a second seat 75 between the outlet 44 and the conduit 26, and a third valve seat 73 adjacent the end of the valve recess 40. A first valve core 50 is provided which normally closes the seat 48, and a second double-faced valve core 72 is provided, which normally closes the third valve seat and thus prevents leakage from the valve. When valve seats 48 and 73 are closed, the conduit 26 and outlet 44 are in communication, and the gauge measures the tire pressure. Stems 51 and 78 of the first and second cores, respectively, are adapted to engage one another so that when the second core is moved away from the third seat 73 and against the second seat 75, the first core is unseated and air may pass from the inlet 16 into the valve and out the outlet 44, the second core simultaneously blocking off the conduit 26 and thus preventing the full force of the pressure line from reaching the gauge.

A more detailed description will now be given. The inflator 10 is intended to be attached near the end of the air pressure hose 11 to control the passage of air into a whip 12 having an outlet valve or chuck 13 which engages the end of the tire stem.

The body 14 of the inflator 10 is preferably made from a light metal or alloy, such as an alloy of magnesium or aluminum. The body 14 is preferably rectangular in cross section so that it fits conveniently in the hand. A recess 15 is bored in from one end to reduce its weight, and parallel to the recess 15 is an air inlet duct 16 into the open end of which is threaded a fitting 17 at the end of the pressure line 11.

The body 14 terminates in an enlarged cylindrical head 18, which preferably lies at an angle of about 40° to the main axis of the body and which has a cylindrical recess 19, adapted to receive the removable gauge 20.

The gauge 20 may be any one of the many accurate and easily readable gauges which can be bought upon the market. The one shown is a completely sealed unit having an unbreakable plastic lens and a calibrated dial. Its air inlet 21 projects beyond its bottom surface and beyond the assembly screws 22. The gauge 20 is prevented from chattering or accidentally revolving in the recess 19 by a rubber band-like washer 23 around its circumference.

The floor 24 of the recess 19 has a pocket 25 to receive the projecting gauge inlet 21 and to provide the termination of an air conduit 26 from the valve. A soft washer 27 in the pocket 25 provides a seal between the conduit 26 and inlet 21. The floor 24 also bears an annular groove 28 which provides clearance for and prevents interference from the gauge screws 22.

The gauge 20 is held in the recess 19, and the inlet 21 is held tightly against the washer 27, by a retaining ring 30 which is held against the lip of the recess 19 by screws 31. The ring 30 may readily be taken off and the gauge 20 removed and replaced, because in this inflator the gauge is separable from its control valve.

The advantages of the inflator valve arise from its relatively small number of simple rugged parts, and from the fact that the air pressure itself is used to seal the passage and to operate the valve. The entire valve is contained in a bore 40 which is perpendicular to and communicates with the interior end of the air inlet duct 16. The bore 40 preferably consists of several successive, coaxial, set-back portions: a first and narrowest chamber 41 adjacent the recess 16; a wider second chamber 42, and a still wider third chamber 43 which is threaded and which extends to the outside wall of the body 14.

The wall of the second chamber 42 has a port for the outlet conduit 44 which leads into a tapped recess 45, into which is threaded a whip fitting 46 on the inflator end of the whip 12. The threaded wall of the third chamber 43 has a port for the conduit 26 which leads to the gauge.

Where the first chamber 41 and the second chamber 42 meet, a shelf 47 is formed on which rests a removable washer-type valve seat 48, made of rubber or synthetic rubber and having an opening substantially smaller than the bore of the first chamber 41. Normally the air pressure in the inlet duct 16 keeps the valve core 50 closed by holding it against the seat 48. The core 50 has a forwardly-extending stem 51 and a rearwardly-extending stem 52 around which is an aligning spring 53 which aids in closing the valve.

In the second chamber 42 is a hollow valve insert member 55, having a flange 56 at one end which supports the valve seat 48 and at its other end it has a wider flange 57 whose washer 58 is supported by a seat 59 which separates the second chamber 42 and the third chamber 43. The insert 55 is held on the seat 59 by the threaded member 65. The insert 55 has an annular relieved portion 61 between its flanges 56 and 57, and a port 60 so that at all times its interior axial bore 62 is in communication with the outlet conduit 44.

Into the third chamber 43 is threaded a flanged hollow valve-retaining nut 65 with a gasket 66 to seal it. Its inner end 64 holds the insert 55 in place. Adjacent the head 67, the nut 65 is ported at 68 to connect the interior axial bore 69 of the nut with the gauge conduit 26. The interior bore 69 is tapered at 73 to provide a valve seat. The insert 55 has a tapered seat 75. A valve member 72 is mounted on the stem 71 and has a tapered face 74 to engage the seat 73 and a tapered face 76 to engage the seat 75. Press-fitted on its end, the valve stem 71 has a trigger button 77, which is used to move the valve member 72. The inside end 78 of the stem 71 is hollowed out at 79 to fit over the end of the stem 51, with clearance between the end of the stem 51 and the bottom of the recess 79 when the valves are seated as in Fig. 2. The stem 51 bottoms in the stem 71 just before the latter has moved the valve face 76 against its seat 75, thereby lifting the valve 50 off its seat 48 only an instant before the valve face 76 seats. This effectively blocks any pressure from the line 11 getting to the gauge conduit 26 and port 68.

The inflator 10 is operated by depressing the button 77 and thus moving the core face 74 away from its seat 73. As the movement continues, the tapered face 76 comes against its seat 75, and the core 50 is then lifted off its seat 48. When the core 50 is thus unseated, compressed air passes from the duct 16 into the axial bore 62, and out through the conduit 44 into the whip 12. When the button 77 is released, the spring 53 and the air pressure both act to close the valve core 50 against its seat 48. At the same time the stem 51 moves the valve 72 to the right. If the chuck 13 is on a tire valve, so there is back pressure from the tire in the hose 12, this pressure will seat the face 74 against its seat 73. Air at the tire pressure will then pass back through the whip 12, into the conduit 44, through the port 60, into the bore 69, out the bleed hole 68 and the conduit 26 to the gauge 20, which will show the air pressure inside the tire.

The valve is easy to repair. When the screws 31 are removed and the retaining ring 30 taken off, the gauge 20 may be taken out and returned or replaced. By unscrewing the nut 65 from the housing, the whole valve assembly may be removed, and individual parts replaced, if desired, before reinsertion.

I claim:

1. In a tire inflator and gauge: the combination of a housing having an outlet port and a gauge-receiving recess, an air inlet bore and a valve bore normal to said inlet bore and connected thereto by an inlet axial to said valve bore, said valve bore being twice set back and having a radial port through the walls of each said set-back portion, one leading to said outlet port and the other to said gauge recess; a gauge in said gauge-receiving recess; a tubular sleeve in said valve bore, having a resilient annular seat bonded to one end and adapted to abut the shoulder formed by the set-back adjacent to the inlet, said sleeve also having a flange at the other end adapted to abut the shoulder between said two set-back portions, the outside wall of said sleeve being relieved intermediate its ends and perforated by a radial bore, so that the axial opening through said sleeve always communicates with said outlet port; a spring-mounted valve member in said inlet bore having a conical portion normally urged against said resilient seat to close the inlet to said valve bore, said conical portion having a stem extending into the axial opening through said sleeve; a nut closing the outer end of said valve bore and abutting said sleeve flange, said nut having an axial opening therethrough and a radial opening therethrough in communication with said gauge port; and a second valve member having an actuating stem extending out through said axial opening in said nut, a resilient face adapted to close said other end of the axial opening through said sleeve, and also having an axial stem which extends into said sleeve and is recessed to slidably receive the stem of said first valve member, so as to provide a lost motion connection whereby the end of said stem recess will engage the encircled stem to lift said first valve member off its seat when said second valve member is seated against said sleeve.

2. In a tire inflator and gauge: the combination of a housing having an outlet port, a gauge-receiving recess, an air inlet bore, and a valve bore connected to said inlet bore, said valve bore being twice set back and having a radial port through the walls of each said set-back portion, one leading to said outlet port and the other to said gauge recess; a gauge in said gauge-receiving recess; a tubular sleeve in said valve bore, having a resilient annular seat at one end adapted to abut the shoulder formed by the set-back nearer to the inlet, said sleeve also having a flange at the other end adapted to extend into the second set-back portion and to abut the shoulder between said two set-back portions, the outside wall of said sleeve being relieved intermediate its ends and perforated by a radial bore, so that the axial opening through said sleeve always communicates with said outlet port; a first valve member in said inlet bore having means normally biasing said valve member toward said resilient seat to close the inlet to said valve bore, said first valve member having a stem extending into the axial opening through said sleeve; a closure member closing the outer end of said valve bore and abutting said sleeve flange, said closure member having an axial opening therethrough and a radial opening therethrough in communication with said gauge port; and a second valve member having an actuating stem extending out through said axial opening in said closure member, a resilient face adapted to close said other end of the axial opening through said sleeve, and also having an axial stem which extends into said sleeve and is recessed to slidably receive the stem of said first member, so as to provide a lost motion connection whereby the end of said stem recess will engage the encircled stem to lift said first valve member off its seat when said second valve member is seated against said sleeve.

3. In a tire inflator and gauge: the combination of a housing having an outlet port, an air inlet bore, and a valve bore connected to said inlet bore, said valve bore being twice set back and having a radial port through the walls of each said set-back portion, one leading to said outlet port; a gauge to which the other radial port leads; a tubular sleeve in said valve bore, having at one end a resilient annular seat adapted to abut the shoulder formed by the set-back adjacent to the inlet, said sleeve also having a flange at the other end adapted to abut the shoulder between said two set-back portions, the outside wall of said sleeve being relieved in between its ends and radially perforated, so that the axial opening through said sleeve always communicates with said outlet port; a spring-mounted valve member extending into said valve inlet from said inlet bore having a conical portion with means normally urging said valve member against said resilient seat to close the inlet to said valve bore, said conical portion having a stem extending into the axial opening through said sleeve; a closure member closing the outer end of said valve bore and abutting said sleeve, said closure member having an axial opening therethrough and a radial opening therethrough in communication with said gauge port; and a second valve member having an actuating stem extending out through said axial opening in said closure member, a resilient face adapted to close said other end of the axial opening through said sleeve, and also having an axial stem which extends into said sleeve and is recessed to slidably receive the stem of said first valve member, so as to provide a lost motion connection whereby the end of said stem recess will engage the encircled stem to lift said first valve member off its seat when said second valve member is seated against said sleeve.

ARCHIBALD R. MOFFETT.

References Cited in the file of this patent

UNITED STATES PATENTS

| Number | Name | Date |
| --- | --- | --- |
| 1,321,929 | Loetzer | Nov. 18, 1919 |
| 1,403,797 | McCormick | Jan. 17, 1922 |
| 1,463,804 | Drager | Aug. 7, 1923 |
| 1,495,679 | Donaldson | May 27, 1924 |
| 1,527,661 | Anderson | Feb. 24, 1925 |
| 1,874,914 | Crowley | Aug. 30, 1932 |
| 1,892,435 | Marchus | Dec. 27, 1932 |
| 2,039,638 | Druge | May 5, 1936 |
| 2,173,619 | Ames | Sept. 19, 1939 |

FOREIGN PATENTS

| Number | Country | Date |
| --- | --- | --- |
| 20,776 | Great Britain | of 1896 |